United States Patent
Javitt et al.

[11] Patent Number: 6,154,297
[45] Date of Patent: Nov. 28, 2000

[54] OPTICAL TRANSCEIVER USING COMMON OPTICAL PATH FOR TRANSMISSION AND RECEPTION

[75] Inventors: Joel I. Javitt, Hillside; Christopher L. Rutledge, Somerset, both of N.J.

[73] Assignee: AT&T Corp, New York, N.Y.

[21] Appl. No.: 08/818,690

[22] Filed: Mar. 19, 1997

[51] Int. Cl.[7] .................................................. H04B 10/00
[52] U.S. Cl. ........................ 359/152; 359/153; 359/159
[58] Field of Search .................................. 359/152, 153, 359/159

[56] References Cited

U.S. PATENT DOCUMENTS

| | | | |
|---|---|---|---|
| 5,031,188 | 7/1991 | Kock et al. | 372/50 |
| 5,047,783 | 9/1991 | Hugenin | 342/179 |
| 5,191,339 | 3/1993 | Riza | 342/372 |
| 5,260,513 | 11/1993 | Giles et al. | 174/35 |
| 5,274,381 | 12/1993 | Riza | 342/368 |
| 5,390,040 | 2/1995 | Mayeux | 359/152 |
| 5,465,170 | 11/1995 | Arimoto | 359/159 |
| 5,594,580 | 1/1997 | Sakanaka et al. | 359/172 |
| 5,627,669 | 5/1997 | Orino et al. | 359/156 |
| 5,684,614 | 11/1997 | Degura | 359/172 |
| 5,689,354 | 11/1997 | Orino | 359/172 |
| 5,739,934 | 4/1998 | Nomura et al. | 359/124 |
| 5,790,291 | 8/1998 | Britz | 359/159 |
| 5,909,297 | 6/1999 | Ishikawa et al. | 359/161 |
| 5,914,976 | 6/1999 | Jayaraman et al. | 372/50 |

FOREIGN PATENT DOCUMENTS

| | | |
|---|---|---|
| 0607906A1 | 7/1994 | European Pat. Off. . |
| 0724340A1 | 7/1996 | European Pat. Off. . |
| WO96/00919 | 1/1996 | WIPO . |

*Primary Examiner*—Leslie Pascal
*Assistant Examiner*—Hanh Phan

[57] ABSTRACT

An optical transceiver that is particularly adapted for free-space optical telecommunication uses the same optical path for received and transmitted light to a large extent to avoid duplication of optical elements. Received light is split so that different portions can be sent to physically spaced photodetectors, one of which is for detecting optically received information, and others of which are for detecting misalignment of the transceiver. In this way, the alignment detectors do not interfere with light reception by the information detector.

17 Claims, 1 Drawing Sheet

6,154,297

OPTICAL TRANSCEIVER USING COMMON OPTICAL PATH FOR TRANSMISSION AND RECEPTION

BACKGROUND OF THE INVENTION

This invention relates to optical telecommunications systems. The invention is particularly advantageous when applied to free-space optical telecommunications.

Free-space optical telecommunications is of recently renewed interest because steps that have been taken to reduce official regulation of the telecommunications industry make it possible from a regulatory standpoint for new telecommunications services providers to enter the service areas of other existing service providers. To economically enter new areas, however, new service providers are looking for ways to avoid having to provide expensive hard-wired connections (e.g., twisted pair wire, coaxial cable, or optical fiber) to the location of each service customer. Radio communication is not a viable alternative for the bulk of the service that must be offered because the radio bandwidth available for such use is limited and still highly regulated.

Free-space optical communication has the potential to solve the problems mentioned above. Free-space optical communication means substantially unguided, point-to-point, line-of-sight communication using light (e.g., infrared light) passing through the atmosphere. In general, such communication is bi-directional because the communications services provider must send information to and receive information from remotely located customers.

A possible limitation of free-space optical communication is that light can only be usefully transmitted through the atmosphere over relatively short distances. Typical distances might be in the range from about 500 meters to about 1,000 meters, dependent upon quality of service. Frequent regeneration of the optical information may therefore be necessary in a system that involves greater distances. In order to keep the system economically viable there is a need for low-cost and efficient optical transceivers which may be required in substantial numbers in the system.

In view of the foregoing, it is an object of this invention to improve and simplify optical transceivers.

It is a more particular object of this invention to provide improved and simplified optical transceivers that are particularly adapted for free-space optical telecommunications.

SUMMARY OF THE INVENTION

These and other objects of the invention are accomplished in accordance with the principles of the invention by providing optical transceivers having a high-speed photodetector for use in detecting the information which is transmitted by light to the transceiver, a position-sensing photodetector array (e.g., a quad sensor) for use in detecting alignment of the transceiver with the light being received, and a source of the light transmitted by the transceiver. To the greatest extent practical or reasonably possible, a common optical path is used for the light received by the transceiver and the light transmitted by the transceiver. Thus, the lens system that focuses received light on the high-speed photodetector is also used to focus received light on the position-sensing photodetector array, a beam splitter being used to direct respective portions of the received light to each of these two types of light receptors. This same lens system is also preferably used to transmit light out from the light source along the same path that light is received by the transceiver.

In a particularly preferred embodiment, the light from the light source passes out through a central aperture in the position-sensing photodetector array. By using a beam splitter to direct some of the received light to a position-sensing photodetector array which is on a different optical axis from the high-speed photodetector, interference of the position-sensing array with light reception by the high-speed photodetector is substantially reduced. This increases efficiency of light reception and information detection by the transceiver. Use of a common optical path and one lens system for most of the travel of both the received and transmitted light helps to lower the cost and increase the reliability of the transceiver.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
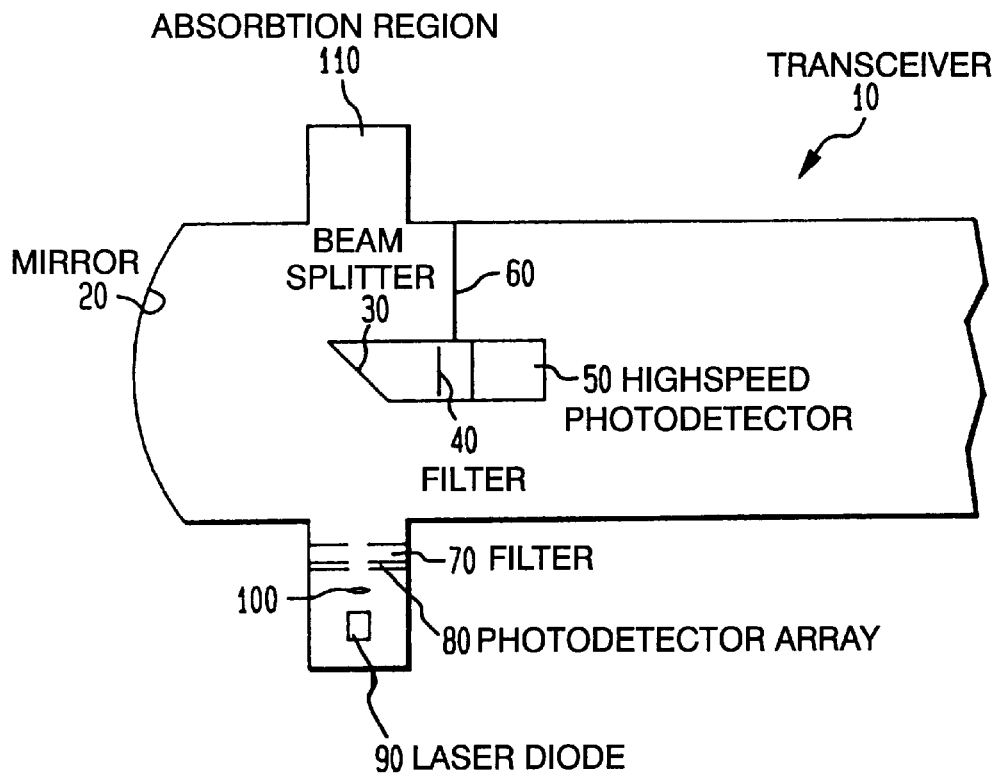
FIG. 1 is a simplified sectional view of an illustrative embodiment of a free-space optical transceiver constructed in accordance with the principles of this invention.

As viewed in FIG. 1, light directed at transceiver 10 through the atmosphere enters the transceiver from the right. At the left-hand end of the transceiver a concave mirror 20 directs incoming light back toward beam splitter 30. Beam splitter 30 allows some of the light from mirror 20 to pass through to high-speed photodetector 50 via filter 40. Elements 30, 40, and 50 are supported in the center of transceiver 10 by one or more struts 60 that extend radially out to the outer body of the transceiver. Mirror 20 focuses the light that passes through elements 30 and 40 on high-speed photodetector 50. Filter 40 is provided to reduce the amount of spurious light (e.g., ambient sunlight) that is seen by detector 50. Detector 50 converts the light it receives to an electrical signal for use by other equipment (not shown) at the location of transceiver 10.

Figure 2:
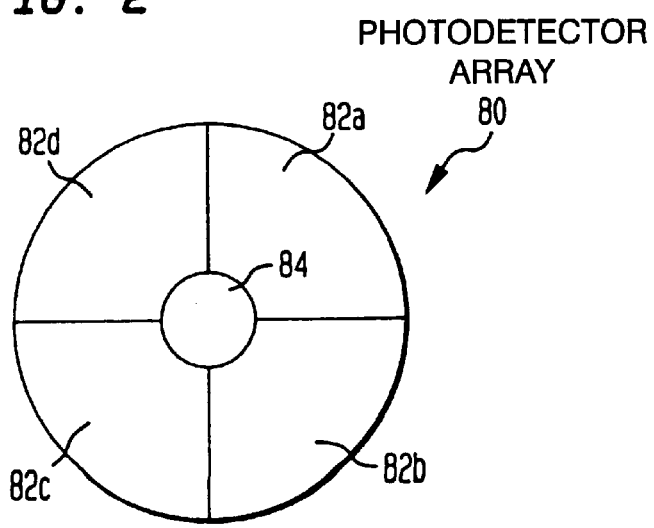
FIG. 2 is a simplified elevational view of an illustrative embodiment of one portion of the apparatus shown in FIG. 1.

Another portion of the light directed to beam splitter 30 by mirror 20 is reflected by the beam splitter toward filter 70 and photodetector array 80. Like filter 40, filter 70 is provided to reduce the amount of spurious light that is seen by array 80. For reasons that will become apparent as the description proceeds, array 80 preferably has a central aperture, and filter 70 also preferably has a corresponding and aligned central aperture. Array 80 may be a conventional quad sensor as shown in more detail in FIG. 2. This is a device with four, electrically isolated, photodetector segments 82a–d disposed circumferentially around a central aperture 84. Mirror 20 focuses received light on quad sensor 80 so that if transceiver 10 is properly aligned with the incoming light, each of segments 82 receives approximately the same amount of light. If transceiver 10 becomes misaligned, however, different amounts of light will be received by the different segments 82 of quad sensor 80. The output signals of the various segments will therefore also differ, and these signal differences can be used by transceiver positioning apparatus (not shown) to reposition the transceiver until it is again properly aligned with the incoming light.

Behind the aperture in photodetector array 80 is a source 90 for the light transmitted by transceiver 10. For example, source 90 may be a laser diode. Lens 100 in front of source 90 helps to focus light from the source for passage out through the apertures in photodetector array 80 and filter 70. After passing through these apertures, light from source 90 impinges on beam splitter 30. Some of this light passes through the beam splitter and is dissipated (i.e., absorbed) in absorption region 110. However, beam splitter 30 redirects another portion of the light from source 90 to mirror 20, which directs that light out of the transceiver (to the right as viewed in FIG. 1) as the light transmitted by the transceiver.

In order to prevent light from source 90 from being erroneously seen by photodetectors 50 and 80, it may be desirable to use a different frequency for the light from source 90 than is used for incoming light to the transceiver. In this way, filters 40 and 70 can be selected to pass the incoming light but to block any light from source 90 that would otherwise reach detectors 50 and 80.

From the foregoing, it will be seen that light is received and transmitted by transceiver 10 along a common optical axis. To a large degree, the same optical elements are economically used for both the received and transmitted light. This applies to mirror 20 and beam splitter 30. Near the end of its travel, the light going to detector array 80 is directed away from high-speed photodetector 50. Detector array 80, therefore, does not interfere with light reception by detector 50, as can happen in prior art arrangements in which light for the high-speed detector must pass through the aperture in the center of the detector array. Light reception by high-speed detector 50 is thereby improved.

It will be understood that the foregoing is only illustrative of the principles of the invention, and that various modifications can be made by those skilled in the art without departing from the scope and spirit of the invention. For example, instead of passing between free space and beam splitter 30 via a single convex mirror 20, light could pass between free space and the beam splitter via another type of optical system such as a Schmidt-Cassegrain telescope.

What is claimed is:

1. An optical transceiver for receiving and transmitting light along a common optical path comprising:
    a first photodetector for detecting light received by said transceiver in order to extract information from said received light;
    a second photodetector spaced from said first photodetector for detecting light received by said transceiver in order to detect misalignment of said transceiver relative to said received light;
    a beam splitter in said common optical path for directing a first portion of said received light to said first photo detector and for directing a second portion of said received light to said second photo detector; and
    a source of light transmitted by said transceiver for directing said transmitted light to said common optical path via said beam splitter; wherein:
        said beam splitter directs a first portion of the light from said source to said common optical path and directs a second portion of the light from said source to another optical path, said transceiver further comprising:
            an absorber for absorbing the second portion of light from said source in another optical path.

2. The transceiver defined in claim 1 wherein said second photodetector and said source are disposed adjacent to one another.

3. The transceiver defined in claim 1 further comprising:
    a filter disposed between said beam splitter and said first photodetector for filtering out any light which is not characteristic of light intended to be received by said transceiver.

4. The transceiver defined in claim 1 further comprising:
    a filter disposed between said beam splitter and said second photodetector for filtering out any light that is not characteristic of light intended to be received by said transceiver.

5. The transceiver defined in claim 1 wherein said second photodetector comprises a quad detector.

6. The transceiver defined in claim 1 wherein said source emits light having a frequency which is different from the frequency of the light received by said transceiver.

7. The transceiver defined in claim 1 wherein said transceiver receives and transmits light via free space.

8. An optical transceiver for receiving and transmitting light along a common optical path comprising:
    a first photodetector for detecting light received by said transceiver in order to extract information from said received light;
    a second photodetector spaced from said first photodetector for detecting light received by said transceiver in order to detect misalignment of said transceiver relative to said received light;
    a beam splitter in said common optical path for directing a first portion of said received light to said first photo detector and for directing a second portion of said received light to said second photo detector; and
    a source of light transmitted by said transceiver for directing said transmitted light to said common optical path via said beam splitter; wherein:
        said second photodetector comprises:
            a plurality of photodetector segments disposed in an array around a central aperture.

9. The transceiver defined in claim 8 wherein said source emits said light transmitted by said transceiver through said aperture.

10. The transceiver defined in claim 9 wherein said source is disposed on the side of said second photodetector which is remote from said beam splitter.

11. The transceiver defined in claim 10 wherein said source is aligned with said beam splitter along an axis which passes through said aperture.

12. The transceiver defined in claim 8 further comprising:
    a filter disposed between said beam splitter and said second photodetector for filtering out any light which is not characteristic of light intended to be received by said transceiver, said filter having an aperture corresponding to and optically aligned with said aperture in said second photodetector.

13. The method of transceiving light via a common optical path for received and transmitted light comprising the steps of:
    splitting light received via said common optical path into first and second portions;
    directing said first portion to a first photodetector for extracting received information from said received light;
    directing said second portion to a second photodetector for extracting from said received light information regarding alignment with said received light; and
    generating via a source light for transmission via said common optical path; and
    further including steps of:
        splitting said light from said source into first and second parts; and
        directing said first part to said common optical path; and absorbing said second part.

14. The method defined in claim 13 further comprising the step of:

locating said source with said second photodetector so that light from said source travels to said common optical path oppositely from travel of said second portion to said second photodetector.

15. The method defined in claim 13 further comprising the step of:

filtering said first portion to remove any light that is not characteristic of light intended to be received.

16. The method defined in claim 13 further comprising the step of:

filtering said second portion to remove any light that is not characteristic of light intended to be received.

17. The method defined in claim 13 wherein said light generated in said generating step has a frequency different from said light received via said common optical path.

* * * * *